(12) United States Patent
Sechrist et al.

(10) Patent No.: US 6,673,133 B2
(45) Date of Patent: Jan. 6, 2004

(54) CYCLONE FOR SEPARATING FINE SOLID PARTICLES FROM A GAS STREAM

(75) Inventors: Paul A. Sechrist, Des Plaines, IL (US); Brian W. Hedrick, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 241 days.

(21) Appl. No.: 09/844,979

(22) Filed: Apr. 27, 2001

(65) Prior Publication Data

US 2002/0144931 A1 Oct. 10, 2002

Related U.S. Application Data

(60) Provisional application No. 60/208,557, filed on Jun. 2, 2000.

(51) Int. Cl.[7] ................................................ B01D 45/12
(52) U.S. Cl. .............................. 55/348; 55/396; 55/457
(58) Field of Search ........................ 55/347, 348, 396, 55/394, 457

(56) References Cited

U.S. PATENT DOCUMENTS

| | | | |
|---|---|---|---|
| 4,279,624 A | * 7/1981 | Wilson ........................ 95/269 |
| 5,372,707 A | 12/1994 | Buchanan et al. ........... 208/161 |
| 5,514,271 A | 5/1996 | Buchanan et al. ........... 203/113 |
| 5,538,696 A | 7/1996 | Raterman et al. ........... 422/147 |
| 5,643,537 A | 7/1997 | Raterman et al. ........... 422/147 |
| 5,690,709 A | 11/1997 | Barnes ........................ 55/348 |

FOREIGN PATENT DOCUMENTS

| EP | 0 344 748 A2 | 5/1989 |
|---|---|---|

\* cited by examiner

Primary Examiner—Robert A. Hopkins
(74) Attorney, Agent, or Firm—John G. Tolomei; James C. Paschall

(57) ABSTRACT

A novel cyclone is disclosed that is effective for separating, from a contaminated gas stream, solid particulates having diameters as low as 4–5 microns. When multiple cyclones of the present invention are affixed between upper and lower tube sheets in a separator device, fine particle removal is possible to the extent required 1) by stringent regulations governing particulate emissions into the atmosphere, or 2) to prevent damage to turbine blades in downstream power recovery equipment. The cyclones are especially relevant to the problem of removing catalyst fines from refinery effluents, most notably fluid catalytic cracking (FCC) regenerator flue gas. The cyclone separation efficiency is enhanced through the use of 1) a uni-directional flow of gas from the contaminated gas inlet to the clean gas outlet and 2) discharge openings on the surface of the cyclone body that allow ejection of solid particulates.

13 Claims, 6 Drawing Sheets

CYCLONE FOR SEPARATING FINE SOLID PARTICLES FROM A GAS STREAM

CROSS-REFERENCE TO RELATED APPLICATION

This application claims priority from Provisional application Ser. No. 60/208,557 filed Jun. 2, 2000, the contents of which are hereby incorporated by reference.

FIELD OF THE INVENTION

The present invention relates to a novel cyclone separator for removing fine solid particulates from a gas stream. The cyclone is especially applicable in a third stage separator apparatus, often used to purify the catalyst fines-laden flue gas stream exiting a refinery fluid catalytic cracking (FCC) catalyst regenerator.

BACKGROUND OF THE INVENTION

The emission of particulates in industrial gas streams must be carefully controlled in light of federal, state, and local regulations designed to curtail pollution. In the area of oil refinery operations, a major concern regarding particulate emissions lies in the flue gas exiting the catalyst regenerator section of fluid catalytic cracking (FCC) units. Current United States federal regulations limit particulate levels to 1 lb. of solids per 1000 lb. of coke burned in the catalyst regenerator, or the equivalent of a flue gas particulate concentration of approximately 80–110 mg/Nm$^3$. Corresponding European regulations currently vary considerably, from 80–500 mg/Nm$^3$; however, this value is expected to decline potentially to 50 mg/Nm$^3$.

FCC technology, now more than 50 years old, has undergone continuous improvement and remains the predominant source of gasoline production in many refineries. This gasoline, as well as lighter products, is formed as the result of cracking heavier (i.e. higher molecular weight), less valuable hydrocarbon feed stocks such as gas oil. Although FCC is a large and complex process involving many factors, a general outline of the technology is presented here in the context of its relation to the present invention.

In its most general form, the FCC process comprises a reactor that is closely coupled with a catalyst regenerator, followed by downstream hydrocarbon product separation. A major distinguishing feature of the process is the continuous fluidization and circulation of large amounts of catalyst having an average particle diameter of about 50–100 microns, equivalent in size and appearance to very fine sand. For every ton of cracked product made, approximately 5 tons of catalyst are needed, hence the considerable circulation requirements. Coupled with this need for a large inventory and recycle of a small particle diameter catalyst is the ongoing challenge to prevent this catalyst from exiting the reactor/regenerator system into effluent streams.

Overall, the use of cyclone separators internal to both the reactor and regenerator has provided over 99% separation efficiency of solid catalyst. Typically, the regenerator includes first and second (or primary and secondary) stage separators for the purpose of preventing catalyst contamination of the regenerator flue gas, which is essentially the resulting combustion product of catalyst coke in air. While normal-sized catalyst particles are effectively removed in the internal regenerator cyclones, fines material (generally catalyst fragments smaller than about 50 microns resulting from attrition and erosion in the harsh, abrasive reactor/regenerator environment) is substantially more difficult to separate. As a result, the FCC flue gas will usually contain a particulate concentration in the range of about 200–1000 mg/Nm$^3$. This solids level can present difficulties related to either the applicable legal emissions standards or the desire to recover power from the flue gas stream. In the latter case, the solids content in the FCC flue gas may be sufficient to damage turbine blades of an air blower to the regenerator if such a power recovery scheme is indeed selected.

A further reduction in FCC flue gas fines loading is therefore often warranted, and may be obtained from a third stage separator (TSS) device containing a manifold of cyclones. Electrostatic precipitators are known to be effective for this gas/solid separation but are far more costly than a TSS, which relies on the induction of centripetal acceleration to a particle-laden gas stream, forcing the higher-density solids to the outer edges of a spinning vortex. To be efficient, a cyclone separator for an FCC flue gas effluent will normally contain many, perhaps 100, small individual cylindrical cyclone bodies installed within a single vessel acting as a manifold. Tube sheets affixing the upper and lower ends of the cyclones act to distribute contaminated gas to the cyclone inlets and also to divide the region within the vessel into sections for collecting the separated gas and solid phases.

In the area of cyclone design, significant emphasis has been placed on so-called "reverse flow" types where incoming gas is added around a gas outlet tube extending from the inlet side of a cylindrical cyclone body. Particle-rich gas can be withdrawn from openings in the sidewall of the cyclone body, while clean gas essentially reverses flow from its initial path toward the end of the cyclone body opposite the gas inlet, back toward the gas outlet. The gas outlet is a tube normally concentric with, and located within the cyclone body. These types of cyclones are described in U.S. Pat. No. 5,514,271 and U.S. Pat. No. 5,372,707, where the inventive subject matter is focused on the shape and distribution of the sidewall openings in order to minimize turbulent eddy formation that can re-entrain solids into the clean gas outlet. In U.S. Pat. No. 5,643,537 and parent U.S. Pat. No. 5,538, 696, devices are contemplated for use with this fundamental cyclone design to further extend, or improve the uniformity of, the vortex flow pattern and thereby increase separation efficiency.

Unfortunately, the requirement by itself for a gas stream to reverse direction and exit the cyclone body on the same side as the gas inlet imposes flow disturbances that are not easily overcome. Cyclones of the type described in U.S. Pat. No. 5,690,709, termed "uniflow", eliminate the re-entrainment of solids associated with the reversal of gas direction. In this case, clean gas moves continually downward and exits the cyclone body below a lower tube sheet, which serves as the physical boundary between the separated particles and purified gas. This design, however, also promotes non-uniform flow patterns, which are here associated with the discharge of particles at essentially right angles to the particle-laden gas vortex, through the open bottom in the cylindrical cyclone body. Again, the basic operation of the cyclone in this case involves a change in direction of gas flow that should ideally be avoided. Furthermore, the open bottom design provides a relatively large surface area for exiting "dirty" gas to enter the bodies of adjacent cyclones in an overall arrangement of cyclones, such as in a TSS. This communication of gas among cyclones reduces separation efficiency.

Aside from general considerations about cyclone design, such as the induction of centripetal acceleration and the maintenance of a uniform flow pattern, further improvements in efficiency associated with any particular cyclone configuration must be verified through actual testing. Indeed, some proposed designs that were believed in principle to mitigate uneven flow patterns and localized eddy formation actually performed quite poorly in laboratory experiments. Even sophisticated computational fluid dynamics computer software has been found in some cases to be a poor predictor of TSS separation efficiency. Therefore, through extensive trial and error, coupled with the overall objective of refining the cyclone internal flow pattern, a significant improvement in fine particle separation from gas streams has been achieved.

SUMMARY OF THE INVENTION

The present invention is an improved cyclone for the separation of solid particulates from a gas stream. Many of these cyclones can be combined in a vessel for use as a third stage separator in the treatment of solid-contaminated gas streams, and in particular flue gas from a refinery fluid catalytic cracking unit or other solid-contaminated gas streams. The cyclone provides a high separation efficiency because a particulate-laden gas vortex is established and travels through the device with minimal flow pattern disturbances. The feed gas and exiting clean gas move in the same direction throughout the separation, and the clean gas, representing the bulk of the feed gas on a volume basis, is removed from the central portion of the vortex using a gas outlet tube extending with the cyclone body. Furthermore, solid particles are forced through openings in the sidewall of the cyclone body to prevent backflow and gas communication among adjacent cyclones, rather than discharged axially.

The use of a plate or other structure to close off the bottom of cyclone body means that particle-laden gas can exit only through openings on the cylinder wall. Thus, the pressure drop across the area through which the gas discharges is generally higher than that for open bottom designs. This increase in pressure drop and gas velocity induces a more forceful ejection of particulates through the cylinder sidewall, thereby preventing re-entry of solids into the cyclone body or any adjacent cyclones operating upon the same principal. In effect, the slots through which the particle-contaminated gas exits act as a "check valve" to prevent backflow and particle re-entrainment into the cyclone body.

The cyclone of the present invention is effective for separating even fine dust particles as small as 4–5 microns in diameter from the feed gas stream. These solid contaminants would otherwise render the contaminated gas non-compliant with environmental regulations or possibly prove detrimental to the proper functioning of power recovery turbines.

Accordingly, in one embodiment the present invention is a cyclone separator for location between an upper and a lower tube sheet in a third stage separator vessel. The cyclone comprises a substantially vertical cyclone body having a closed bottom end and a top end fixed with respect to the upper tube sheet. The cyclone body defines a feed gas inlet at its top end for receiving a particle-contaminated gas stream from above the upper tube sheet. A sidewall of the cyclone body defines a plurality of discharge openings between the upper and the lower tube sheets for tangentially discharging particles and a minor amount of an underflow gas stream. The cyclone of the present invention also comprises one or more swirl vanes proximate the gas inlet to induce centripetal acceleration of the particle-contaminated gas stream. The apparatus further comprises a gas outlet tube located centrally within the cyclone body, extending through the closed bottom, and further extending through the lower tube sheet. The gas outlet tube defines a clean gas inlet, usually above the discharge openings, for receiving a purified gas stream from within the cyclone body and further defines a clean gas outlet located below the lower tube sheet for discharging the purified gas stream.

In another embodiment the present invention is a fluidized catalytic cracking process for cracking a heavy hydrocarbon feed. The process comprises contacting the heavy hydrocarbon feed with a cracking catalyst to produce a light hydrocarbon product and a spent catalyst having coke deposited thereon. The process further comprises regenerating the spent catalyst in a catalyst regenerator by contacting the spent catalyst with air to burn the coke and provide a regenerated catalyst and a flue gas. The process further comprises separating the regenerated catalyst from the flue gas using a first stage and a second stage separator located within the catalyst regenerator to yield a catalyst fines-contaminated flue gas stream. The process further comprises recycling the regenerated catalyst to the cracking reactor for further production of the light hydrocarbon product. Lastly, the process comprises purifying the catalyst fines-contaminated flue gas stream in a third stage separator apparatus having an upper and a lower tube sheet contained therein and a plurality of cyclones between the upper and lower tube sheets. In this embodiment, each cyclone comprises a substantially vertical cyclone body having a closed bottom end and a top end fixed with respect to the upper tube sheet. The cyclone body defines a feed gas inlet at its top end for receiving a particle-contaminated gas stream from above the upper tube sheet. A sidewall of the cyclone body defines a plurality of discharge openings between the upper and the lower tube sheets for discharging particles and a minor amount of an underflow gas stream. The cyclone of the present invention also comprises one or more swirl vanes proximate the gas inlet to induce centripetal acceleration of the particle-contaminated gas stream. The apparatus further comprises a gas outlet tube located centrally within the cyclone body, extending through the closed bottom, and further extending through the lower tube sheet. The gas outlet tube defines a clean gas inlet, usually located above the discharge opening, for receiving a purified gas stream from within the cyclone body and further defines a clean gas outlet located below the lower tube sheet for discharging the purified gas stream.

DETAILED DESCRIPTION OF THE INVENTION

The present invention applies to the purification of a broad range of solid-contaminated gas streams, and especially those containing dust particles in the 1–10 µm range. A number of commercial gas purification operations meet this description, including the treatment of effluent streams of solid catalyst fluidized bed processes, coal fired heaters, and power plants. Several well-known refinery operations rely on fluidized bed technology, such as a preferred embodiment of the process for converting methanol to light olefins, as described in U.S. Pat. No. 6,137,022, using a solid zeolitic catalyst composition. Another area of particular interest lies in the purification of fluid catalytic cracking (FCC) effluent streams that contain entrained catalyst particles resulting from attrition, erosion, and/or abrasion under process conditions within the reactor.

Figure 1:
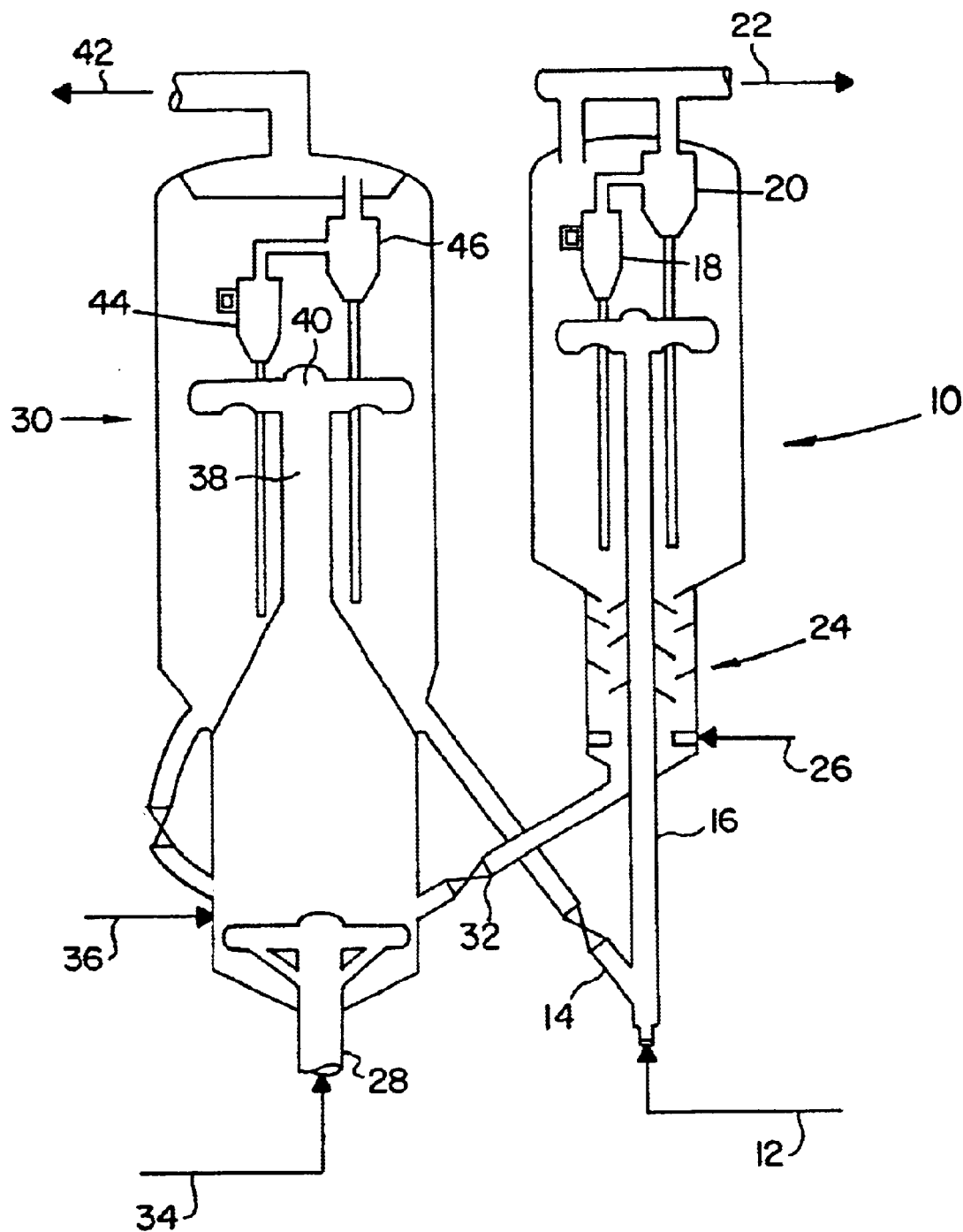
FIG. 1 is a simplified schematic view of an FCC unit of the prior art.

As mentioned, fluid catalytic cracking (FCC) is a well-known oil refinery operation relied upon in most cases for gasoline production. Process variables typically include a cracking reaction temperature of 400–600° C. and a catalyst regeneration temperature of 500–900° C. Both the cracking and regeneration occur at an absolute pressure below 5 atmospheres. FIG. 1 represents a typical FCC process unit of the prior art, where a heavy hydrocarbon feed or raw oil in line 12 is contacted with a newly regenerated catalyst entering from a regenerated catalyst standpipe 14. This contacting occurs along a narrow section extending from the bottom of the reactor 10, known as the reactor riser 16. Heat from the catalyst vaporizes the oil, and the oil is thereafter cracked in the presence of the catalyst as both are transferred up the reactor riser into the reactor 10 itself, operating at a pressure somewhat lower than that of the riser 16. The cracked light hydrocarbon products are thereafter separated from the catalyst using first stage 18 and second stage 20 internal reactor cyclones and exit the reactor 10 through line 22 to subsequent fractionation operations. At this point, some inevitable side reactions occurring in the reactor riser 16 have left detrimental coke deposits on the catalyst that lower its activity. The catalyst is therefore referred to as being spent (or at least partially spent) and requires regeneration for further use. Spent catalyst, after separation from the hydrocarbon product, falls into a stripping section 24 where steam is injected in line 26 to purge any residual hydrocarbon vapor. After the stripping operation, the spent catalyst is fed to the catalyst regenerator 30 using a spent catalyst standpipe 32.

In the catalyst regenerator 30, a stream of air from line 34 is introduced through an air distributor 28 to contact the spent catalyst, burn coke deposited thereon, and provide regenerated catalyst. The catalyst regeneration process adds a substantial amount of heat to the catalyst, providing energy to offset the endothermic cracking reactions occurring in the reactor riser 16. Some fresh catalyst is added in line 36 to the base of the regenerator 30 to replenish catalyst exiting the reactor as fines material or entrained particles. Catalyst and air flow upward together along the combustor riser 38 located within the regenerator 30 and, after regeneration (i.e. coke burn), are initially separated by discharge through a "T" disengager 40, also within the regenerator 30. Finer separation of the regenerated catalyst and flue gas exiting the disengager 40 is achieved using first stage 44 and second stage 46 regenerator cyclone separators within the catalyst regenerator 30. Regenerated catalyst is recycled back to the cracking reactor 10 through the regenerated catalyst standpipe 14. As a result of the coke burning, the flue gas vapors exiting at the top of the regenerator in line 42 contain $CO_2$ and $H_2O$, along with smaller amounts of other species. While the first stage 44 and second stage 46 regenerator cyclone separators can remove the vast majority of the regenerated catalyst from the flue gas in line 42, fine catalyst particles, resulting mostly from attrition, invariably contaminate this effluent stream. The fines-contaminated flue gas therefore typically contains about 200–1000 $mg/Nm^3$ of particulates, most of which are less than 50 microns in diameter. In view of this contamination level, and considering both environmental regulations as well as the option to recover power from the flue gas, the incentive to further purify the flue gas using a third stage separator (TSS) is significant.

Figure 2:
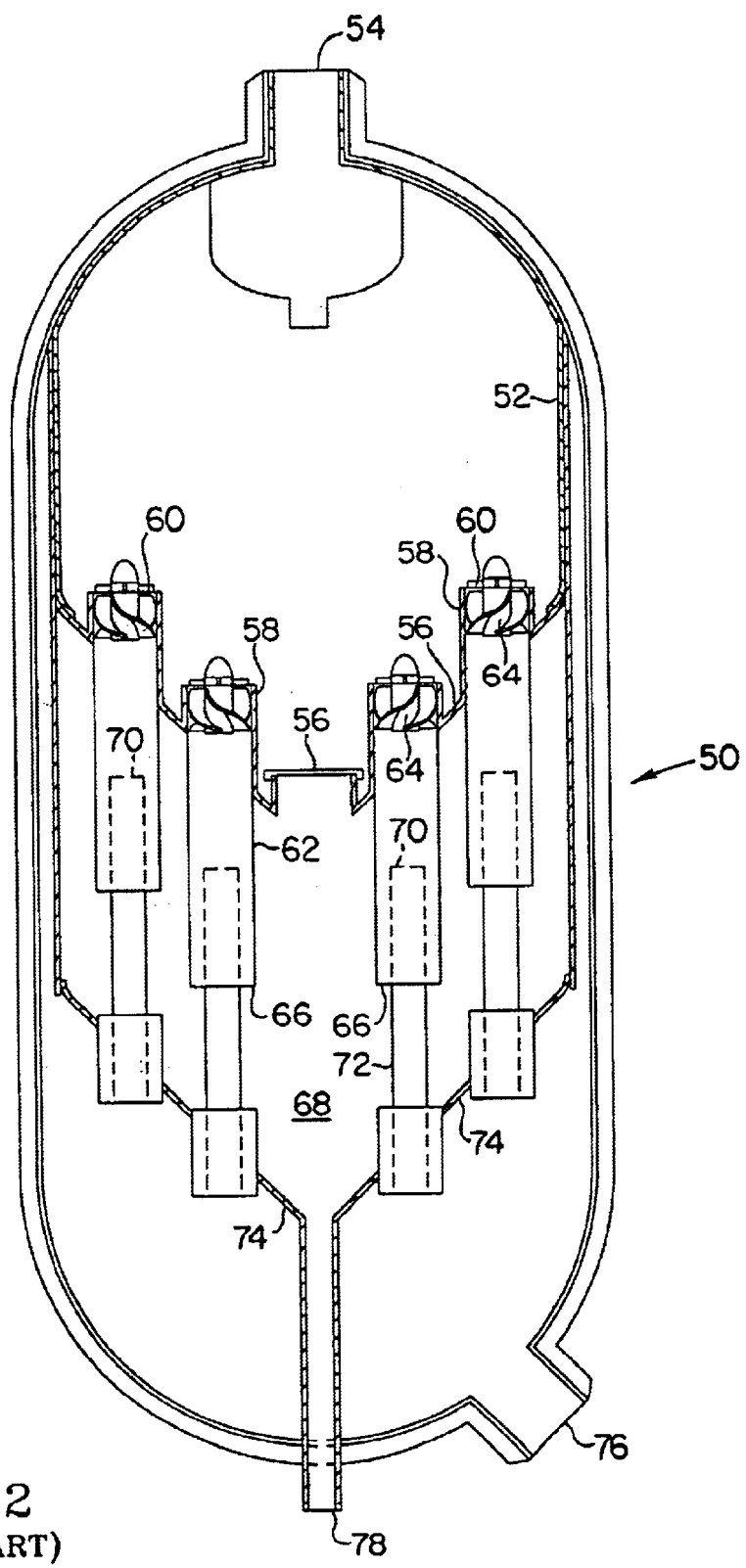
FIG. 2 is a simplified schematic view of a third stage separator of the prior art.

A typical TSS of the prior art, containing numerous individual cyclones, is shown in FIG. 2. The TSS vessel 50 is normally lined with refractory material 52 to reduce erosion of the metal surfaces by the entrained catalyst particles. The fines-contaminated flue gas from the FCC regenerator enters the top of the TSS at its inlet 54 above an upper tube sheet 56 that retains the top ends 58 of each cylindrical cyclone body 62. The contaminated gas stream is then distributed among cyclone feed gas inlets 60 and contacted with one or more swirl vanes 64 proximate these inlets to induce centripetal acceleration of the particle-contaminated gas. The swirl vanes are structures within the cyclone body that have the characteristic of restricting the passageway through which incoming gas can flow, thereby accelerating the flowing gas stream. The swirl vanes also change the direction of the contaminated gas stream to provide a helical or spiral formation of gas flow through the length of the cyclone body. This spinning motion imparted to the gas sends the higher-density solid phase toward the wall of the cyclone body 62.

The cyclone design shown in FIG. 2 represents the so-called "uniflow" apparatus where a bottom end 66 of the cyclone body 62 is open, allowing solid particles that have been thrown near the wall of this cylinder to fall into the space 68 between the upper and lower tube sheets. Clean gas, flowing along the centerline of the cyclone body, passes through an inlet 70 of a gas outlet tube 72 before reaching the bottom end 66 of the cyclone body 62. The clean gas is then discharged via the gas outlet tube 72 below a lower tube sheet 74. The combined clean gas stream, representing the bulk of the fines-contaminated flue gas, then exits through a gas outlet 76 at the bottom of the TSS vessel 50. The separated particles and a minor amount (typically less than 10% of the fines-contaminated flue gas) of underflow gas are removed through a separate particulate and underflow gas outlet 78 at the bottom of the TSS 50.

Figure 3:
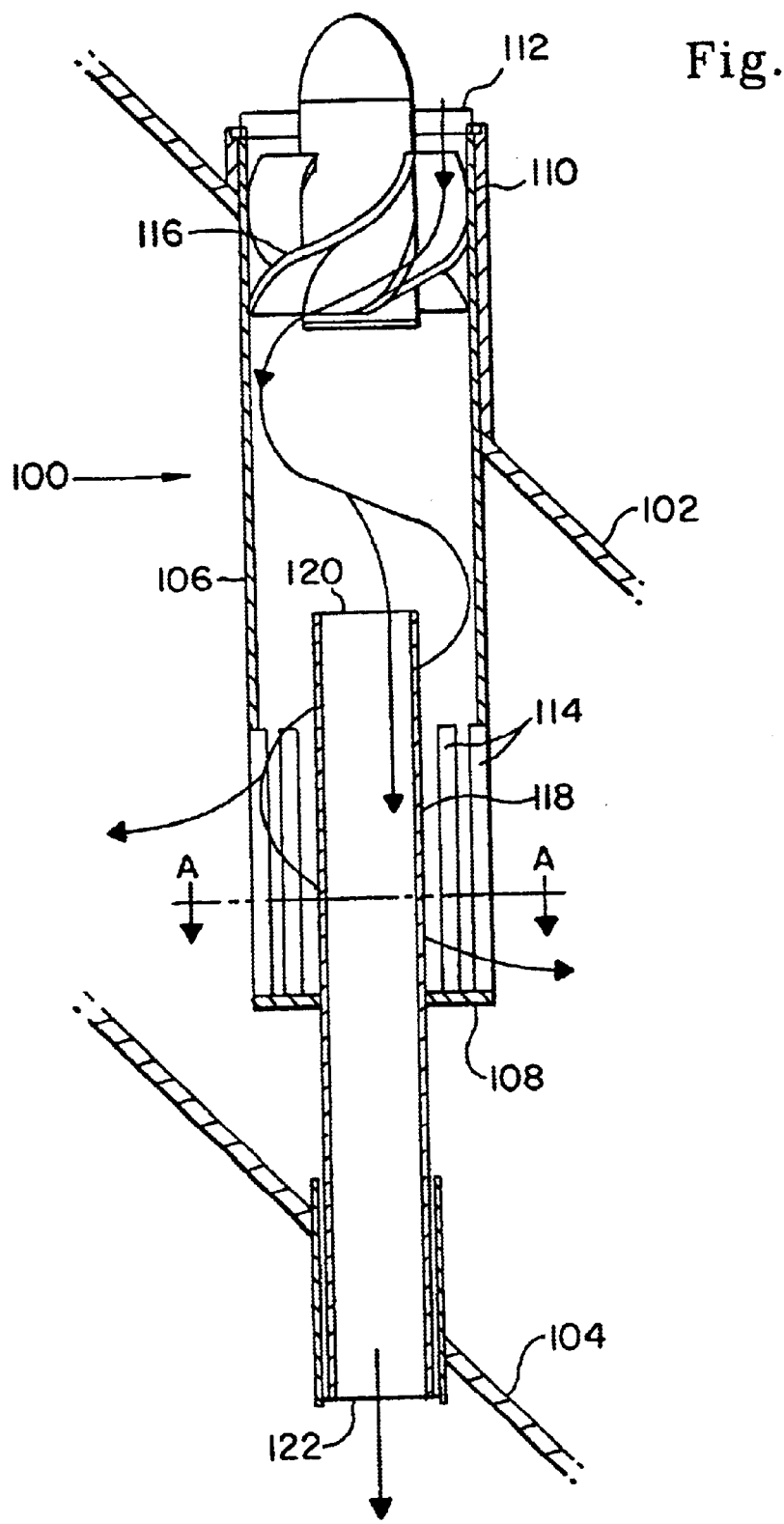
FIG. 3 is a cross sectional view of the cyclone of the present invention.

In FIG. 3, an individual cyclone separator 100 of the present invention, also affixed between an upper tube sheet 102 and a lower tube sheet 104, is shown. The cyclone 100 comprises an essentially vertical cyclone body 106 having a closed bottom end 108 with the cyclone body fixed at its top end 110 to the upper tube sheet 102. The closed bottom end 108 is preferably in the form of a horizontal plate. The cyclone body defines a feed gas inlet 112 at its top end 110 for receiving a particle-contaminated gas stream (e.g. a fines-contaminated flue gas stream) from above the upper tube sheet 102. Also, the cyclone body further defines a plurality of openings 114 for discharging gas. These openings 114 are between the upper tube sheet 102 and the lower tube sheet 104, and are generally located in the lower portion of the cyclone body 106. Preferably, these openings 114 are proximate the bottom end 108 and extend upward from it. These openings allow for the discharge of particles along with a minor amount of an underflow gas, typically less than 10% of the particle-contaminated gas by volume, between the upper tube sheet 102 and the lower tube sheet 104. Closure of the bottom end 108 induces a high gas velocity and pressure drop through the discharge openings 114 by providing relatively little surface over which the exiting gas can escape. This leads to an overall improved separation.

One or more swirl vanes 116 are located proximate the gas inlet at the top of the cyclone to induce centripetal acceleration of the particle-contaminated gas stream. A gas outlet tube 118 is located centrally within the cyclone body 106, extends through the closed bottom end 108, and further extends upward through the lower tube sheet 104. The top and bottom ends of this gas outlet tube 118 define, respectively, a clean gas inlet 120 for receiving a purified gas stream from within the cyclone body 106 and near its centerline, and a clean gas outlet 122 below the lower tube sheet 104 for discharging the purified gas stream. The clean gas inlet 120 is generally located above the discharge openings 114. The clean gas outlet 122 can be located anywhere below the bottom end 108. As mentioned, the cyclone body 106 is oriented generally vertically, so that separation of the solid phase is assisted by gravity. Preferably, the cyclone body is in the form of a vertical cylinder, however, other shapes are certainly possible, including, for example, a cone shape.

As noted previously, the major advantage of this design is that it provides a very uniform vortex of swirling gas that is essentially undisturbed along its downward path through the cyclone body and gas outlet tube. A further advantage is related to the increased pressure drop accompanying the ejection of particulate-rich gas through the cylinder wall openings. These openings provide a relatively small surface area for gas to exit, compared to the larger bottom ring-shaped surface between the cyclone body and the gas outlet tube, used in the aforementioned uniflow cyclone designs. As a result, each opening provides a type of "check valve" through which backflow of discharged gas, a cause of reduced separation efficiency, is substantially eliminated.

The uniformity in gas flow is maintained in part through the use of a plurality of openings on the cyclone cylinder body for discharge of particles and a small amount of underflow gas. The openings may be of virtually any shape and located anywhere on the cyclone cylinder body, although it is preferred that at least some of these openings are near the closed bottom end of the cyclone to prevent an accumulation of solid particles in this region. The openings may also be of varying shapes, for example, slots and holes, and located at various elevations on the cyclone body. Preferably, at least some of the openings are in the form of rectangular slots with their major dimension (length) substantially parallel to the axis of the cyclone body, as depicted in FIG. 3. These slots are normally spaced uniformly about the circumference of the cyclone body. Also, the vertical slot lengths usually range from about 5% to about 25% of the length of the cyclone body. In a preferred embodiment, the lower ends of the rectangular slots are adjacent to the closed bottom of the cyclone body.

Figure 4:
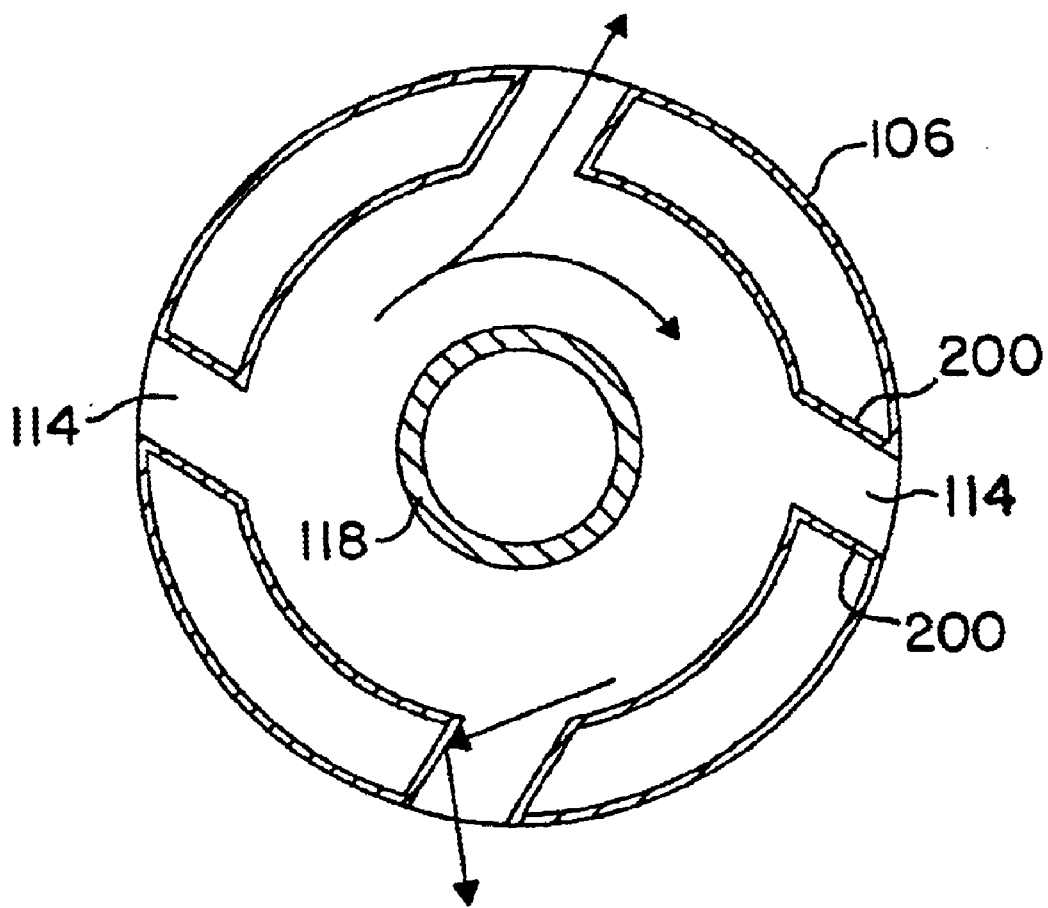
FIG. 4 is a sectional view of FIG. 3 taken along line AA.

To further promote flow uniformity and thereby improve overall solid-gas separation efficiency, that the gas discharge openings are inclined from a radial direction. This allows gas to exit the cyclone body without a substantial change in its swirling, tangential flow direction, as established within the cyclone body. An example of this desired configuration is illustrated in FIG. 4, where the slots 114 also have edges 200 that are beveled (i.e. not normal to the line tangent to the circular cross section of the cyclone body 106 where the slots 114 are located). This beveling with respect to the curvature of the cyclone body 106 has the desired effect of allowing gas to exit the cyclone body 106 with a significant tangential velocity component and minimal change from the direction of gas flow within the cyclone body. Also, the leading edge along the principal length of each rectangular slot may be slightly raised from the general curvature of the cyclone body to divert the gas flow in the desired tangential direction. Alternatively or concurrently, the trailing edge of the slot may be sunk into the general curvature for a similar effect.

Furthermore, it has been determined that good solid/gas separation efficiencies are obtained when the openings are located below the clean gas inlet, which is also represented in FIG. 3. The total open area through which spinning gas may be discharged is preferably from about 0.05% to about 5% of the surface area of the cyclone body. This parameter, of course, depends on several factors including solid contaminant concentration, average particle size, gas flow rate, and pressure. When multiple cyclones of the present invention are used in the design of a third stage separator (TSS) for an FCC refinery unit, the separator performance efficiency preferably includes a d50 particle size of below 5 microns. As understood in the art, the d50 value represents the diameter of a dust particle that is 50% removed in the underflow gas of the TSS. Accordingly, in a preferred embodiment, the purified gas stream has a concentration of particles of 5 microns or greater that is less than about 50% of the concentration of particles of 5 microns or greater in the catalyst fines-contaminated flue gas stream.

The performance benefit obtained using the cyclone of the present invention is further clarified in the following examples, which provide laboratory test data from experiments designed to simulate conditions found in FCC flue gas effluent streams. Although the following examples illustrate specific embodiments of the cyclone separator of the present invention, they are not intended to limit the overall scope of the invention as set forth in the claims.

COMPARATIVE EXAMPLES 1–7

The previously mentioned "uniflow" type cyclone separators of the prior art were compared in performance to various cyclone separators according to the present invention. Separation of particulate matter of 40 microns in diameter and smaller from a flowing gas stream was investigated. The cyclone separator in each test included a 280 mm i.d. cylindrical body with a 130 mm gas outlet tube concentric with the cylinder and extending from about 250 mm above, to well below, the bottom of the cylinder.

In the comparative tests, except for this gas outlet tube extension, the bottom of the cylinder was open, although a disk was mounted on the exterior of the gas outlet tube about 130 mm below the cylinder bottom. Separated particulates, having been discharged at essentially right angles to the spinning feed gas flow, were collected, along with a minor amount of underflow gas, in a dust hopper surrounding the cylindrical cyclone body. Both this gas and the clean (overflow) gas exiting through the gas outlet tube were analyzed for solid contamination levels as well as the particle size distribution of these contaminants. Likewise, these analyses were performed on the feed gas.

In each separate experiment, the feed gas inlet flow rate to the cyclone was maintained at 0.45–0.50 $Nm^3$/sec. This gas contained 300–400 $mg/Nm^3$ of solids with a median particle diameter of 10–20 microns. After exiting the swirl vanes near the gas inlet, the gas velocity gas was accelerated due to the flow restriction effected by these vanes. The gas discharged with the bulk of separated solids, called the underflow gas, represented either 1% or 3% by volume of the feed gas, depending on the specific test. After each test, the efficiency of solid particulate removal was calculated as a weight percentage of the feed solids that were removed in the underflow gas. The percentage of solid particles in this stream of less than 10 microns in diameter was also determined, along with the calculated estimate of the particle diameter for which 50% removal would be achieved (the d50 value).

Results for these comparative examples are summarized in Table 1.

TABLE 1

| Comparative Example | Underflow Gas (vol-%) | Vane Exit Gas Velocity (m/sec) | Separation Efficiency (%) | Particles <10 μm (%) | d 50 Value (μm) |
|---|---|---|---|---|---|
| 1 | 1 | 24.1 | 76.3 | 78.5 | 7.5 |
| 2 | 1 | 39.3 | 82.8 | 84.8 | 5.7 |
| 3 | 3 | 40.5 | 82.1 | 93.9 | 6.2 |
| 4 | 3 | 40.3 | 83.7 | 93.3 | 5.5 |
| 5 | 3 | 24.1 | 80.7 | 76.8 | 6.7 |
| 6 | 3 | 38.9 | 84.9 | 87.5 | 5.5 |
| 7 | 3 | 39.5 | 85.0 | 87.4 | 5.4 |

EXAMPLES 8–12

The cyclone separator of the present invention was tested, by including in the cyclone design a horizontal base that was used to close the bottom of the cylinder body. In accordance with the description of the present invention, the solid particulates were in this case discharged from the spinning feed gas through openings in the cyclone cylinder sidewall. This was achieved by forming two rectangular slots of about 90 mm in length and about 10 mm in width. The length was parallel to the axis of the cylindrical cyclone body, and the lower width dimension was adjacent to the horizontal base closing the bottom of the cyclone body. The conditions of the feed gas flow rate, particulate level, and average particulate diameter were maintained within the ranges given in the Comparative Examples. Again, studies were performed using underflow values of 1% and 3% by volume. Also, the same performance parameters were evaluated and are given in Table 2.

TABLE 2

| Example | Underflow Gas (vol-%) | Vane Exit Gas Velocity (m/sec) | Separation Efficiency (%) | Particles <10 μm (%) | d50 Value (μm) |
|---|---|---|---|---|---|
| 8 | 1 | 39.7 | 88.7 | 91.6 | 5.1 |
| 9 | 1 | 24.1 | 85.0 | 89.5 | 6.2 |
| 10 | 3 | 40.2 | 89.9 | 71.5 | 4.4 |
| 11 | 3 | 40.2 | 90.1 | 87.7 | 5.0 |
| 12 | 3 | 24.6 | 87.7 | 87.8 | 5.7 |

Figure 5:
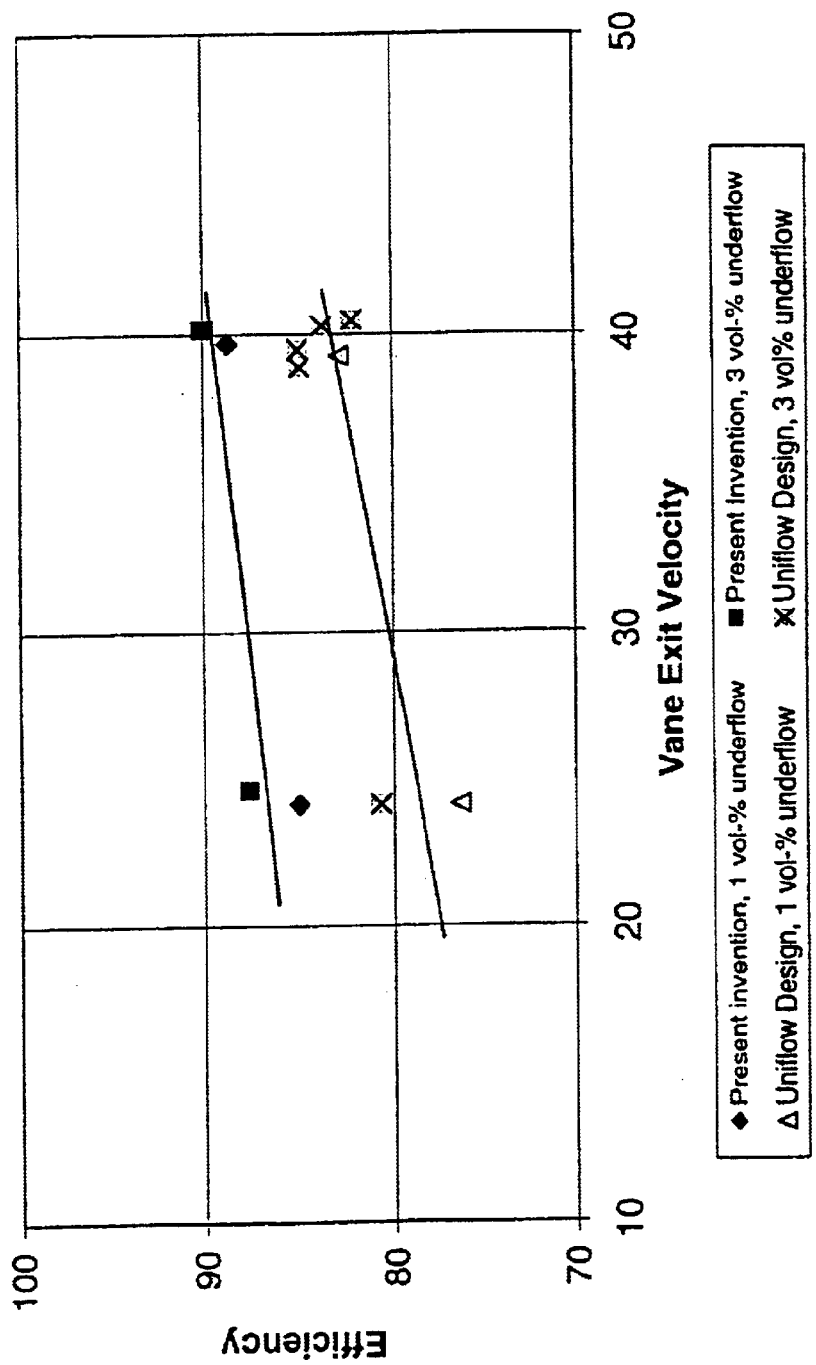
FIG. 5 shows the improved separation performance efficiency of the cyclone of the present invention, compared to those of the prior art.
Figure 6:
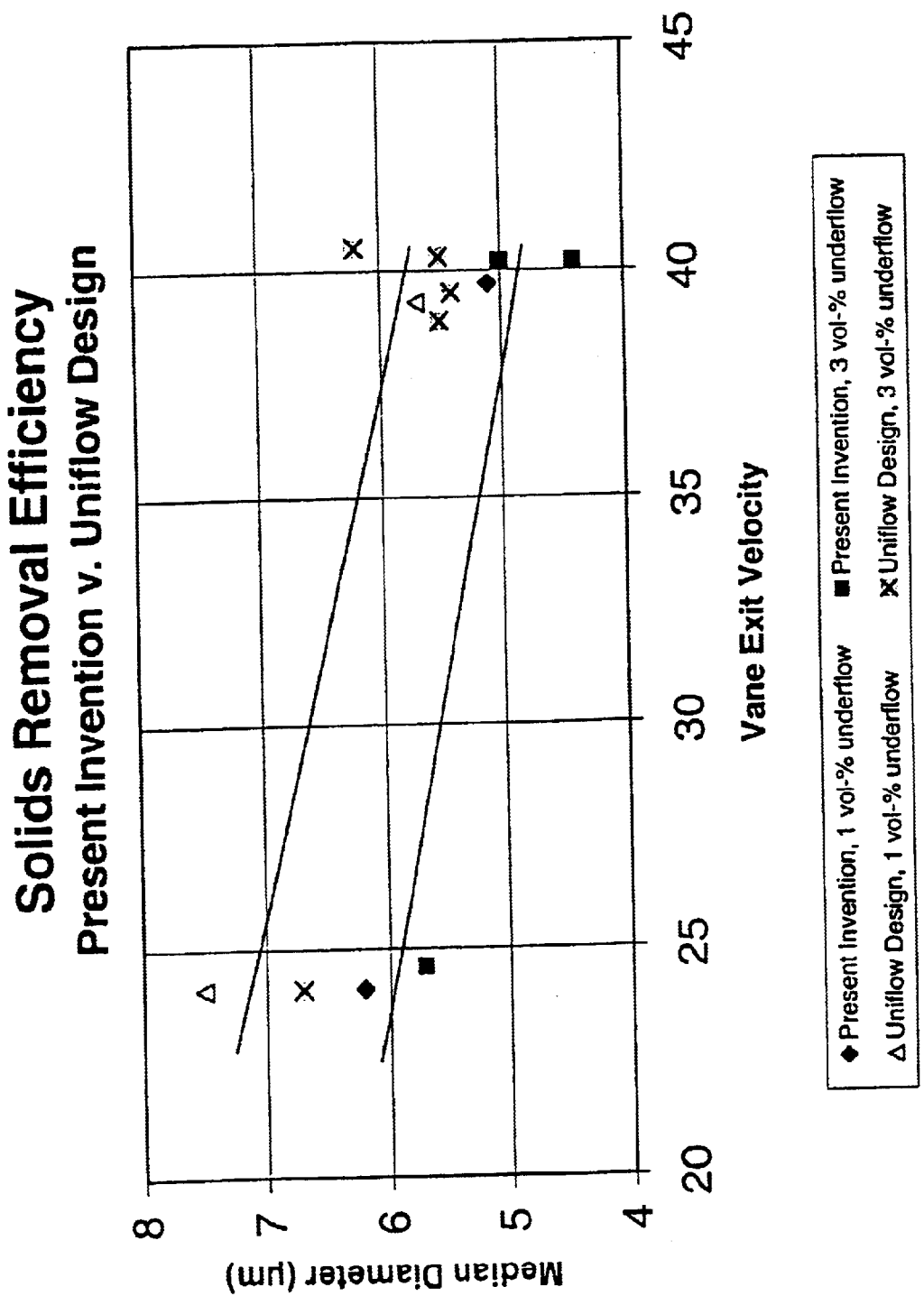
FIG. 6 shows the improvement associated with the present invention in terms of its d50 value, or measure of the particle diameter for which 50% removal would be obtained.

From the above test results, it is evident that the cyclone of the present invention, when compared to the open-bottom "uniflow" cyclone of the prior art, provides greater efficiency of solid particulate removal at both the 1% and 3% underflow conditions. This is illustrated graphically in FIG. 5. Furthermore, the cyclone separator of the present invention is superior for removing particulates of 4–5 microns in diameter, which are relevant for the overall improvement of FCC third stage separator designs. The increased ability of the present invention cyclone separator to separate small particulates, based on its d50 performance parameter, is illustrated in FIG. 6. Lastly, in contrast to the results in the Comparative Examples for cyclone separators of the prior art, the cyclone separator of the present invention consistently achieved a clean (overflow) gas solids contamination level of less than 50 mg/Nm$^3$, in compliance with current and even potential future legislation.

What is claimed is:

1. A cyclone separator for use between an upper and a lower tube sheet, the cyclone comprising:
    a) a substantially vertical cyclone body having a closed bottom end and a top end fixed with respect to the upper tube sheet, the cyclone body defining a feed gas inlet at its top end, the feed gas inlet extending above the upper tube sheet for receiving a particle-contaminated gas stream therefrom, the cyclone body further defining a sidewall of the cyclone body, the sidewall defining a plurality of discharge openings located between the upper and the lower tube sheets for discharging particles and a minor amount of an underflow gas stream;
    b) one or more swirl vanes located proximate the gas inlet to induce centripetal acceleration of the particle-contaminated gas stream;
    c) a gas outlet tube defining a clean gas inlet in a top end of said gas outlet tube, said clean gas inlet located centrally within the cyclone body for receiving a purified gas stream and said gas outlet tube further defining a clean gas outlet located below the lower tube sheet for discharging the purified gas stream, the gas outlet tube extending through the closed bottom end of the cyclone body and further extending through the lower tube sheet.

2. The cyclone separator of claim 1 where the discharge openings have a total open area from about 0.05% to about 5% of the surface area of the cyclone body.

3. The cyclone separator of claim 1 where the cyclone body is substantially cylindrical in shape.

4. The cyclone separator of claim 1 where the closed bottom end is a substantially horizontal planar surface.

5. The cyclone separator of claim 1 where the clean gas inlet is located above the discharge openings.

6. The cyclone separator of claim 1 where the discharge openings are inclined from the radial direction to allow the discharge of gas without substantial change from its tangential direction within the cyclone body.

7. The cyclone separator of claim 1 where the discharge openings define substantially rectangular slots having lengths substantially parallel to the axis of the cyclone body, the slots spaced uniformly about the circumference of the cyclone body.

8. The cyclone separator of claim 7 where the vertical slot lengths are from about 5% to about 25% of the length of the cyclone body.

9. The cyclone separator of claim 7 where the lower ends of the rectangular slots are adjacent to the closed bottom of the cyclone body.

10. The cyclone separator of claim 7 where the lower ends of the rectangular slots extend to the closed bottom of the cyclone body.

11. A process for purifying a solid-contaminated gas stream using the cyclone separator of claim 1.

12. A cyclone separator for use between an upper and a lower tube sheet, the cyclone comprising:
    a) a substantially vertical cyclone body having a closed bottom end and a top end fixed with respect to the upper tube sheet, the cyclone body defining a feed gas inlet at its top end, the feed gas inlet extending above the upper tube sheet for receiving a particle-contaminated gas stream therefrom, the cyclone body further defining a sidewall of the cyclone body, the sidewall defining a plurality of discharge openings located between the upper and the lower tube sheets for discharging particles and a minor amount of an underflow gas stream, said discharge openings having a total open area from about 0.05% to about 5% of the surface area of the cyclone body;

b) one or more swirl vanes located proximate the gas inlet to induce centripetal acceleration of the particle-contaminated gas stream;

c) a gas outlet tube defining a clean gas inlet end located centrally within the cyclone body for receiving a purified gas stream and further defining a clean gas outlet located below the lower tube sheet for discharging the purified gas stream, the gas outlet tube extending through the closed bottom end of the cyclone body and further extending through the lower tube sheet.

13. A cyclone separator for use between an upper and a lower tube sheet the cyclone comprising:

a) a substantially vertical cyclone body having a closed bottom end and a top end fixed with respect to the upper tube sheet, the cyclone body defining a feed gas inlet at its top end, the feed gas inlet extending above the upper tube sheet for receiving a particle-contaminated gas stream therefrom, the cyclone body further defining a sidewall of the cyclone body, the sidewall defining a plurality of discharge openings located between the upper and the lower tube sheets for discharging particles and a minor amount of an underflow gas stream, said discharge openings define substantially rectangular slots having lengths substantially parallel to the axis of the cyclone body, the slots spaced uniformly about the circumference of the cyclone body;

b) one or more swirl vanes located proximate the gas inlet to induce centripetal acceleration of the particle-contaminated gas stream;

c) a gas outlet tube defining a clean gas inlet end located centrally within the cyclone body for receiving a purified gas stream and further defining a clean gas outlet located below the lower tube sheet for discharging the purified gas stream, the gas outlet tube extending through the closed bottom end of the cyclone body and further extending through the lower tube sheet.

* * * * *

UNITED STATES PATENT AND TRADEMARK OFFICE
CERTIFICATE OF CORRECTION

PATENT NO. : 6,673,133 B2
DATED : January 6, 2004
INVENTOR(S) : Paul A. Sechrist et al.

It is certified that error appears in the above-identified patent and that said Letters Patent is hereby corrected as shown below:

<u>Title page, Item [54] and Column 1, lines 1-2,</u>
Replace the title "CYCLONE FOR SEPARATING FINE SOLID PARTICLES FROM A GAS STREAM" with -- APPARATUS AND PROCESS FOR SEPARATING FINE SOLID PARTICULATES FROM A GAS STREAM --.

Signed and Sealed this

Sixth Day of April, 2004

JON W. DUDAS
*Acting Director of the United States Patent and Trademark Office*